(12) United States Patent
Nishijima et al.

(10) Patent No.: US 6,183,005 B1
(45) Date of Patent: Feb. 6, 2001

(54) STEERING MODULE

(75) Inventors: Masataka Nishijima; Satoru Unno; Keizo Nishitani, all of Shizuoka (JP)

(73) Assignee: Yazaki Corporation, Tokyo (JP)

( * ) Notice: Under 35 U.S.C. 154(b), the term of this patent shall be extended for 0 days.

(21) Appl. No.: 08/878,576

(22) Filed: Jun. 19, 1997

(30) Foreign Application Priority Data

Jun. 21, 1996 (JP) .................................... 8-162219

(51) Int. Cl.$^7$ .............................. B60R 21/16; H01H 9/08
(52) U.S. Cl. .................... 280/731; 200/61.54; 200/61.57
(58) Field of Search ................. 280/731, 728.3; 200/61.54, 61.55, 61.56, 61.57

(56) References Cited

U.S. PATENT DOCUMENTS

| | | | |
|---|---|---|---|
| 5,744,769 | * 4/1998 | Proctor et al. | 200/61.54 |
| 5,808,374 | * 9/1998 | Miller et al. | 307/10.1 |
| 6,040,542 | * 3/2000 | Wolfe | 200/512 |
| 6,062,595 | * 5/2000 | Ha | 280/731 |

FOREIGN PATENT DOCUMENTS 2-95949    4/1990   (JP) ............................... B60R/16/02

* cited by examiner

*Primary Examiner*—Lanna Mai
*Assistant Examiner*—Jeff Restifo
(74) *Attorney, Agent, or Firm*—Sughrue, Mion, Zinn, Macpeak & Seas, PLLC

(57) ABSTRACT

A steering module is so designed that a switch module coupled to a steering wheel has switch operating sections which can be replaced when necessary. The switch module includes a printed circuit board (PCB) having a switch programmable function; a connecting circuit element which electrically connects the PCB to an electronic combination switch; connectors which are detachably connected to switching units forming switch operating sections; and a semiconductor read-only memory (ROM) which can be replaced from outside a rear casing which accommodates the connecting circuit element and the PCB.

8 Claims, 7 Drawing Sheets

FIG. 8

| | A1 | | A2 |
|---|---|---|---|
| A | ON | | OFF |
| B | | POWER | |
| C | | AM/FM | |
| D | | SEEK | |

FIG. 9

| | A1 | | A2 |
|---|---|---|---|
| A | OFF | | ON |
| B | | AUTO | |
| C | | SWITCHING BETWEEN INNER AIR AND OUTER AIR | |
| D | | DEF | |

FIG. 10

| | A1 | | A2 |
|---|---|---|---|
| A | OFF | | OFF |
| B | | RESUME | |
| C | | CANCEL | |
| D | | SET | |

STEERING MODULE

BACKGROUND OF THE INVENTION

This invention relates to a steering module provided at the center of a steering section of an automobile, and more particularly to the structure of a switch module coupled to the steering module.

Recently, an automobile has been improved in the automation of various operations. With this, travel controlling switches, radio operating switches, etc. are collectively provided at the steering section. A variety of steering switch modules of this type are available. Japanese Patent Unexamined Publication No. Hei 2-95949 has disclosed one example of the steering switch module which is designed as follows:

That is, as shown in FIG. 11, a pad 81 is provided at the center of a steering handle 80, and a car radio operating section 82, and a telephone operating section 83 are provided on the pad 87.

The internal structure of the pad 81 is shown in FIG. 12. A membrane switch sheet 85, and the pad 81 are fixedly mounted on a printed circuit board 86, and movable operating keys 82 and 83 are provided on the pad 81. The membrane switch sheet 85 comprises: a spacer; and a thin sheet having electrodes at positions corresponding to those of the operating keys 82 and 83.

The printed circuit board 86 has rectangular openings 87 at the positions corresponding to those of the operating keys 82. Around each of the openings 87, an elliptic contact is formed as a low electrode. Furthermore, the printed circuit board 86 has elliptic contacts at the positions corresponding to those of the telephone operating key 83, and near each of the elliptic contacts a rectangular or square opening 88 is provided so that a light emitting diode is set in it.

In the above-described steering switch module, the membrane switch sheet 85 and the pad 81 are fixedly mounted on the printed circuit board 86 including the contracts and the output circuit. Hence, the resultant switch module is relatively thin, and small in the number of components.

However, the above-described switch module is rather troublesome to install, because it includes no connecting circuit element which is used for the connection of a wire harness laid in the vehicle body. More specifically, in coupling the switch module to the steering section, it is necessary to additionally perform a connector connecting operation.

Furthermore, the switches on the switch module are limited in function, and it is impossible to mount switches on it, which have other functions.

One of the current technical tendencies of automobiles is to improve the safety. As one link in the improvement of safety, air bags are mounted in the vehicle. However, as for the above-described switch module, the provision of air bags are not taken into consideration. Hence, the switch module is not practical in use.

SUMMARY OF THE INVENTION

Accordingly, an object of the invention is to provide a steering module which is simplified in structure as a whole, and which makes it possible to collectively obtain various functions and to improve the functions, and to allow standardizing the wire harness.

The foregoing object of the invention has been achieved by the provision of a steering module which is coupled through an electronic combination switch to a steering column on a vehicle body; in which, according to the invention, between the electronic combination switch and a steering wheel, a switch module is provided which has a switch operating section which is replaced in response to a given control.

In the steering module, the switch module comprises: a PCB (printed circuit board) having a switch programmable function which selects an operating mode in correspondence to the traveling control and performs a control operation; a connecting circuit element which electrically connects the electronic combination switch to the PCB; connectors mounted on the end portions of the PCB; switch means which are selectively coupled to the connector from outside a rear casing which accommodates the connecting circuit element and the PCB, and are controlled; and a semiconductor read-only memory ROM which is mounted on the PCB and replaced from outside the rear casing.

Furthermore, in the steering module, a steering pad is mounted on the switch module through the steering wheel. The steering pad has an air bag and switch operating members adapted to control tact switches on the PCB.

In the above-described steering module, the switch module coupled to the steering wheel has a switch operating section which may be replaced when necessary.

Therefore, the switch operating section can be replaced in response to a given control; that is, without replacement of the whole switch module, a desired control function is obtained. Thus, the steering module having the switch module has a variety of functions, and is simplified in structure.

With respect to the switch module in which the switching means are replaceable, the PCB having the switch programmable function has the connecting circuit element which electrically connects the electronic combination switch to the PCB, and the connector which detachably connects switch means forming the switch operating section, so that the switch means can be replaced, and the ROM can be replaced from outside the rear casing which accommodates the connecting circuit element and the PCB.

Hence, by coupling the switch module to the steering wheel, the electronic combination switch is electrically connected to the switch module. That is, the coupling work and the wiring work are achieved at the same time. This means that the coupling work is high in efficiency according to the invention.

Furthermore, the steering pad having the air bag can be coupled through the steering wheel to the switch module. The steering pad has the switch members to drive the tact switches on the PCB. Hence, the steering module is increased in the number of functions, and is improved in safety.

BRIEF DESCRIPTION OF THE DRAWINGS

FIG. 8 is an explanatory diagram showing relationships between the operations of the switches and radio operation modes.

FIG. 9 is an explanatory diagram showing relationships between the operations of the switches and air conditioner modes.

FIG. 10 is an explanatory diagram showing relationships between the operations of the switches and auto cruise modes.

DETAILED DESCRIPTION OF THE INVENTION

Figure 1:
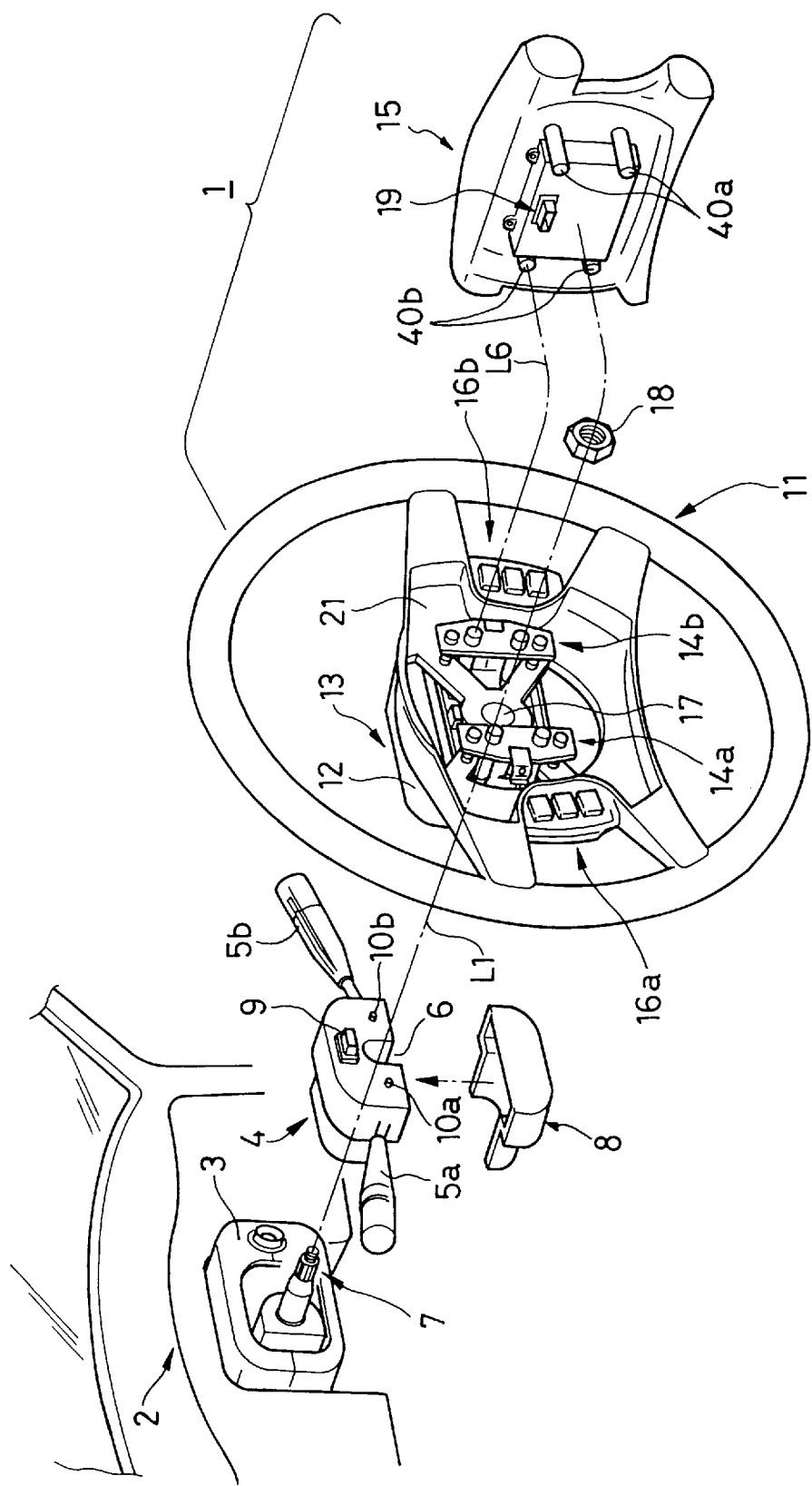
FIG. 1 is a perspective view showing the arrangement of a steering module on a vehicle body according to the invention.
Figure 2:
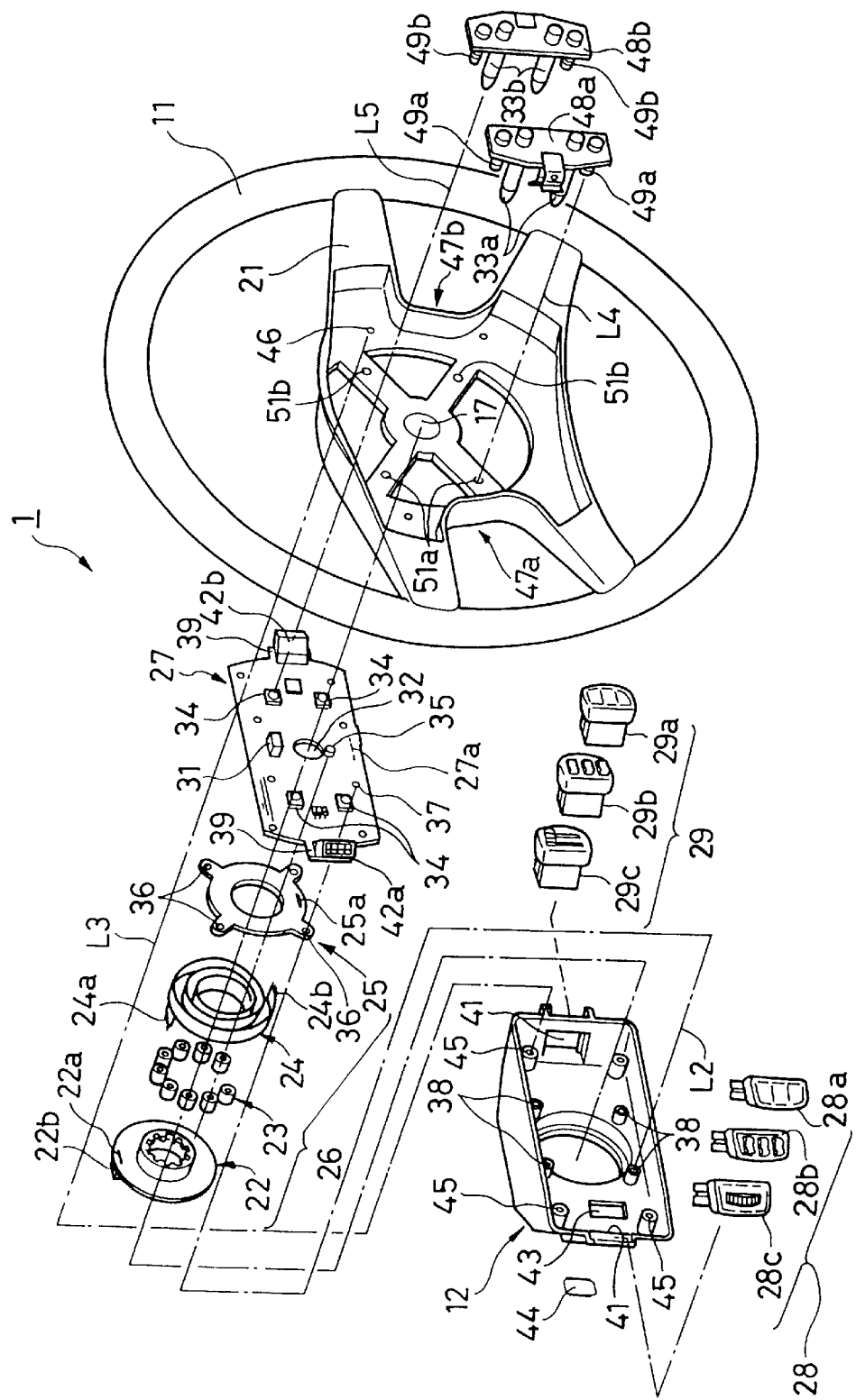
FIG. 2 is an exploded perspective view showing the structure of an example of the steering module, which is a first embodiment of the invention, and its switch module.

A steering module., which constitutes a first embodiment of the invention, will be described with reference to FIGS. 1 and 2. FIG. 1 is a perspective view showing the arrangement of a steering module on a vehicle body; and FIG. 2 is a perspective view showing the arrangement of the steering module, the first embodiment of the invention, and its switch module, in detail.

In the description of the embodiment, first the whole arrangement of the steering module will be described, and then the structures of essential components thereof and the assembling of the same.

As shown in FIG. 1, a steering module 1 is mounted on a steering column 3, mounted on a front panel 2 of an automobile, through an electronic combination switch 4. The steering module 1 comprises: a steering wheel 11; a switch module 13 built in a rear casing 12 provided behind the steering wheel 11; steering pad bases 14a and 14b mounted on the right and left side of the center of the front of the steering wheel 11; a steering pad 15 covering the steering pad bases 14a and 14b; and switch operating sections 16a and 16b provided on the right and left sides of the steering pad 15. The steering pad 15 is equipped with an air bag.

The electronic combination switch 4 has right and left operating levers 5a and 5b which are turned or swung to indicate a direction in which the vehicle is turned. The switch 4 has a groove-shaped inserting section 6 at the center into which a steering shaft 7 is inserted. A column cover 8 is coupled to the electronic combination switch 4 from below to be mounted on the steering column 3.

The electronic combination switch 4 has a connector 9 in the upper portion of the side surface thereof, and guide pins 10a and 10b in the lower portion of the side surface. The connector 9 is used for electrical connection of the switch module 13 (described later). The guide pins 10a and 10b serve as positioning means when the electronic combination switch is coupled to the switch module 13.

The steering wheel 11 has an inserting hole 17 at the center into which the steering shaft 7 is inserted. The steering module 1 is combined with the steering column 3 as follows: First, the steering shaft 7 is inserted into the inserting hole 17, and fixed with a nut 18, and under this condition the steering pad 15 is mounted. With the steering pad 15 mounted, not only the nut 18 but also the steering pad bases 14a and 14b are covered with the steering pad 15, so that, when an accident occurs, the air bag operates to protect the driver from injury. The switch operating sections 16a and 16b are provided on the right and left sides of the steering pad 15. The structure and operation of those sections 16a and 16b will be described later.

Now, the structure of the steering module 1 will be described.

The steering module 1 is assembled as follows: The switch module 13 is mounted on the back of a frame 21 which is provided at the center of the steering wheel 11, and the steering pad bases 14a and 14b and the steering pad 15 are mounted on the front.

The switch module 13, as shown in FIG. 2, includes the following components in a rear casing 12: a connecting circuit element (clock spring) 26 made up of a stationary holder 22, rollers 23, an FFC (flexible flat cable) 24 and a clock spring cover 25; a PCB 27 having a switch programmable function; and LH switches 28 and RH switches 29.

The stationary holder 22 and the rollers 23 are to rotatably support the steering wheel 11 with respect to the steering shaft 7. The FFC 24 is spiral, and its one end 24a is connected through a slit 22a formed in the stationary holder 22 to a connector 22b, so that it is detachably coupled to a connector 9 provided on the electronic combination switch 4.

The other end 24b of the FFC 24 is inserted into a slit 25a formed in one end of the clock spring cover 25 and into a slit 27a formed in the PCB 27, and soldered to a circuit pattern (not shown) for instance by soldering.

The PCB 27 has a connector 31 at one end. The connector 31 is connected through a circuit pattern to the other end 27a of the aforementioned PCB 27. Hence, with the switch module 13 mounted, the connector 9 of the electronic combination switch 4 is connected through the FFC 24 to the connector 31 of the PCB 27.

On the other hand, as shown in FIG. 1, the steering pad 15 has the connector 19 on the back. Hence, when the steering module 1 is combined with the steering column 3, the electronic combination switch 4 is connected through the connector 9 to the switch module 13, and electrically connected through the connectors 19 and 31 to the steering pad 15.

The PCB 27 has an inserting hole 32 substantially at the center into which the steering shaft 7 is inserted. The PCB 27 further has a steering angle sensor 35 and tact switches 34 which are driven by switch members 33a and 33b which are provided on the steering pad bases 14a and 14b. The tact switches 34 are used for various purposes; for instance, the tact switch 34 is used for a horn (to change the tone for instance).

The steering angle sensor 35 is made up of a photo-sensor, and operates as follows: As the steering wheel 11 turns, the sensor 35 detects a light beam passed through slits formed in the stationary holder 22, to determine a steering angle.

When the switch module 13 is mounted, the members forming the connecting circuit element 26, and the PCB 27 are set in the rear case 12 in such a manner that they are stacked one on another. In the case of FIG. 1, openings into which the steering shaft 7 is inserted are formed one after another on the center line L1. The threaded end portion of the steering shaft 7 is protruded from the inserting hole 17 formed in the central portion of the steering wheel 11. Hence, it is secured to the steering wheel 11 with the aforementioned nut 18.

With the connecting circuit element 26 and the PCB 27 set in the rear casing 12, four screw inserting holes 36 of the clock spring cover 25 are communicated with screw inserting holes 37 formed in the PCB 27, and communicated with four threaded holes 38 formed in the rear casing 12 as indicated by line L2. Hence, when the switch module 13 has been mounted, the members forming the connecting circuit element 26 are accommodated in the rear casing 12 while being covered with the clock spring cover 25, and are fixed with screws set from the front of the PCB 27.

The rear casing 12 has a rectangular replacing window 43 in the side wall, so that, as was described before, when the PCB 27 is coupled thereto, a part of the rear of the PCB 27 is exposed in the replacing window 43. Hence, through the replacing window 43, a new (replacing) ROM 44 may be mounted on the PCB 27 or the old ROM may be removed from the latter 27.

Under this condition, a pair of plate-shaped protrusions 39 formed on both ends of the PCB 27 are protruded outside the rear casing 12 through openings 41 which are formed in the right and left end portions of the rear casing 12. The two protrusions 39 and 39 have switch connectors 42a and 42b, respectively. Those connectors 42a and 42b will be described later. The PCB 27 includes a switch programmable circuit for communication control and horn control.

The switch module 13 is coupled to the steering wheel 11 as follows: Four threaded holes 45 formed on the side wall of the rear casing 12, are aligned with four screw inserting holes 46 formed in a frame 21 as indicated by the line L3, and screws (not shown) are engaged through the inserting hole 46 with the threaded holes 45, thereby to fixedly couple the switch module 13 to the steering wheel 11.

When the switch module 13 has been coupled to the steering wheel 11 in the above-described manner, the connectors 42a and 42b on the protrusions 34 of the PCB 27 are exposed in a pair of recesses 47a and 47b of the frame 21. The connector 42a exposed in the recess 47a is detachably connected to the LH switch 28, namely, a variety of switches 28a through 28c. The switch 28a is operated when depressed, the switch 28b is operated by swinging its actuator right and left and the switch 28c is like a potentiometer; that is, it is so designed that its amount of control can be analogously changed.

The connector 42b exposed in the recess 47b is detachably connected to the RH switch 29, namely, a variety of switches 29a through 29c. The switch 29a is operated on and off when depressed, the switch 29b is operated on and off by swinging its actuator right and left, and the switch 29c is like a tandem type potentiometer.

When the switch module 13 is coupled to the steering wheel 11 in the above-described manner, and the connector 42a is connected, for instance, to the switch 28a while the connector 42b is connected to the switch 29a, then the switch operating sections 16a and 16b (FIG. 1) are formed. As is apparent from the above description, the connectors 42a and 42b may be connected to the other switches 28b, 28c, 29b and 29c so that the switch operating sections 16a and 16b are freely changed to the other switches. The replacement of those switches is carried out in response to a desired operation mode. In this connection, the ROM 44 is also replaced if the case requires.

The structure of the steering pad bases 14a and 14b, and the mounting of the steering pad bases 14a and 14b on the steering wheel 11 will be described.

The steering pad bases 14a and 14b comprises plate-shaped base boards 48a and 48b, the aforementioned switch members 33a and 33b, and locking protrusions 49a and 49b to secure the base boards 48a and 48b to the frame 21, respectively.

On the other hand, the frame 21 of the steering wheel 11 has locking holes 51a and 51b for locking the locking protrusions 49a and 49b. And, as indicated by the line L4, the locking holes 51a and 51b are aligned with the locking protrusions 49a and 49b, and under this condition, the locking protrusions 49a and 49b are pushed into the locking holes 51a and 51b. As a result, as shown in FIG. 1, the steering pad bases 14a and 14b are secured to the frame 21.

Under this condition, the switch members 33a and 33b, as indicated by the line L5, are confronted with the tack switches 34 provided on the PCB 27. Next, the steering pad 15 shown in FIG. 1 is coupled to the steering pad bases 14a and 14b, so that the switch operating members 40a and 40b on the steering pad 15, as indicated by the line L6, are coupled to the switching members 33a and 33b on the steering pad bases 14a and 14b. Hence, when the switch operating members 40a and 40b are operated from the front of the steering pad 15 (FIG. 1 showing the rear of the steering pad 15), the tack switches 34 on the PCB 27 are operated through the switch members 33a and 33b.

The PCB 27 has the connector 31, while the steering pad 15 has a movable connector 19. Therefore, when the steering pad 15 is fixed, the connectors 31 and 19 are connected, so that it is achieved at the same time to fix and to electrically connect the steering pad 15.

As was described above, in the steering module 1, the connecting circuit element 26 is provided in the switch module 13. Hence, while the mounting of the steering module 1 is achieved, the electrical connection of the electronic combination switch 4, the switch module 13 and the steering pad 15 are achieved.

The PCB 27 is so designed that it has a switch programmable function, and that a variety of switches 28a through 29c can be selectively connected thereto, and that the ROM 44 for selecting the switching operation can be freely replaced. Hence, on one base board, various operations such as switch control, multiple control, horn control or tone control, and detection of operating timing and steering angle can be carried out. The connecting circuit element 26 is built in the switch module 13. This means that, in mounting the steering module 1, the number of components is reduced as much. On the other hand, when the steering module 1 is mounted, its electrical connection is achieved. This means that the mounting work is improved in work efficiency as much.

Figure 3:
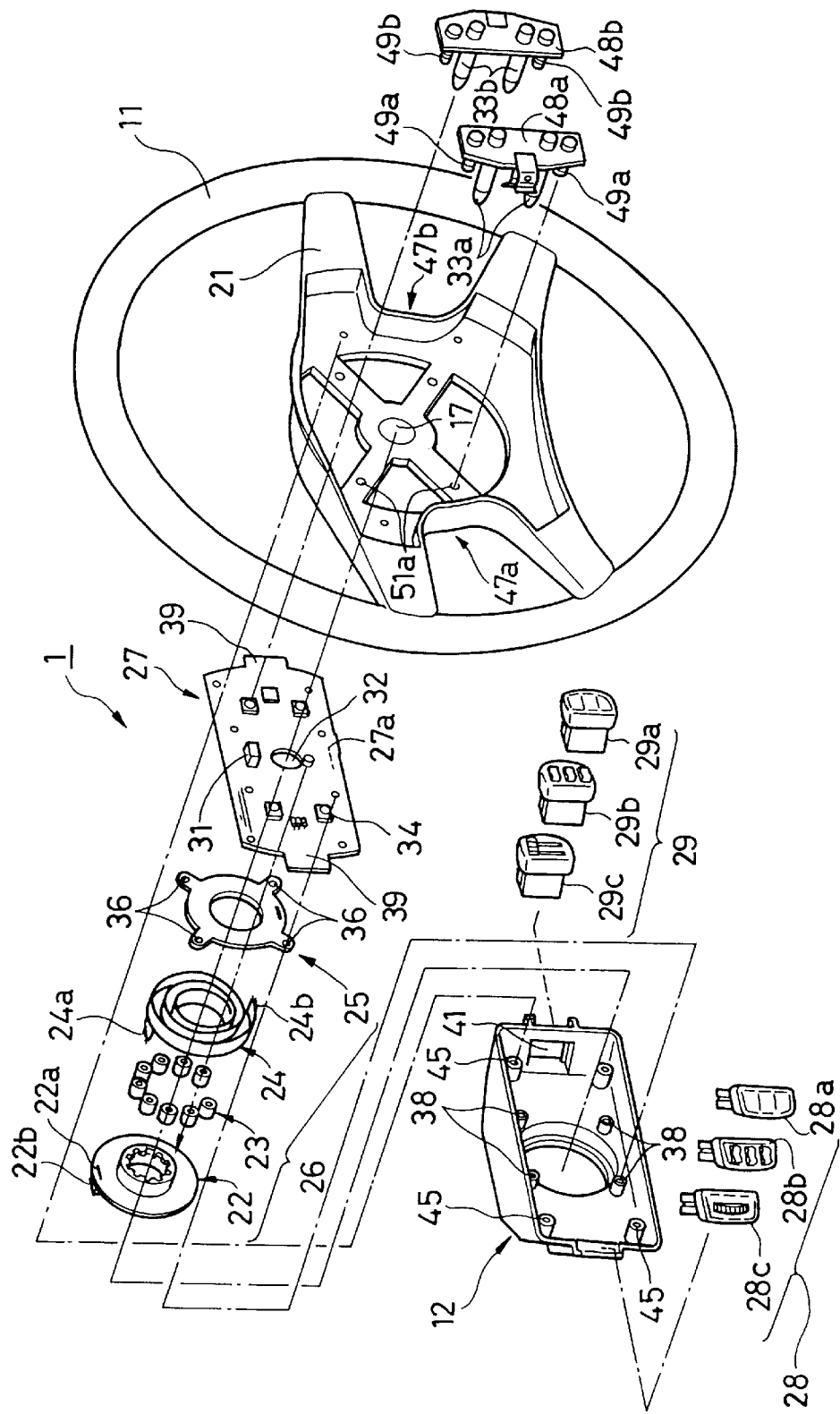
FIG. 3 is an exploded perspective view showing the structure of another example of the steering module, which is a second embodiment of the invention, and its switch module.
Figure 4:
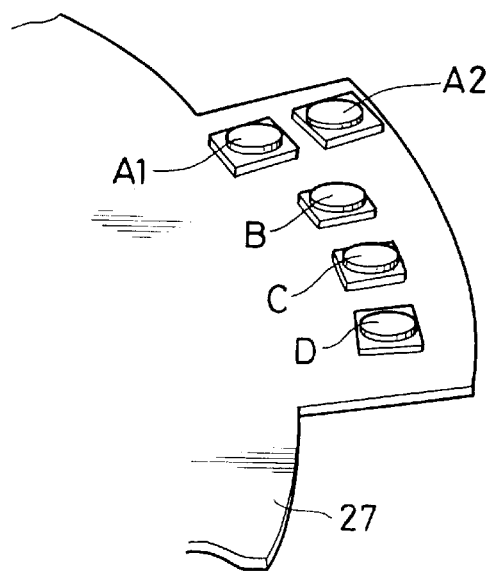
FIG. 4 is a fragmental perspective view of essential parts of a PCB, showing the installation of various switches.
Figure 5:
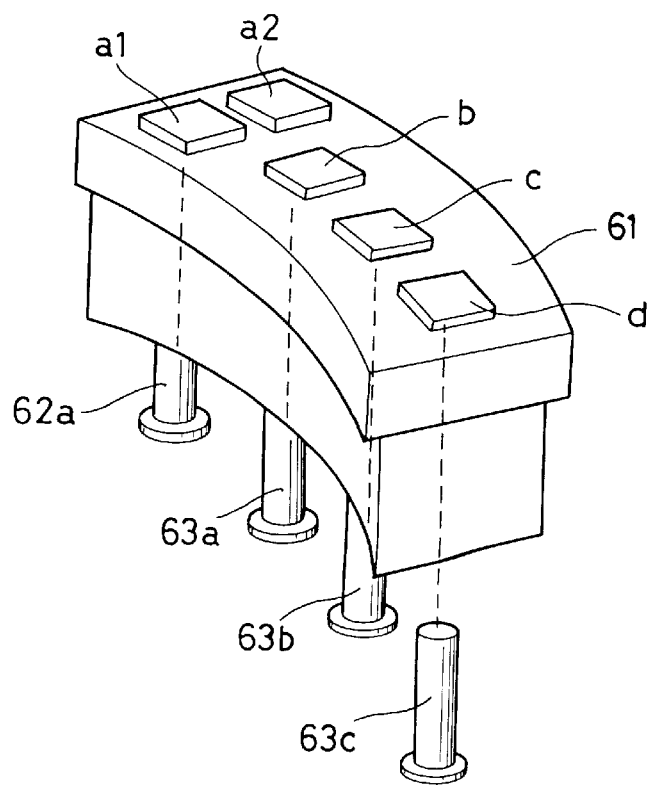
FIG. 5 is an exploded perspective view of essential components of the switches.
Figure 6:
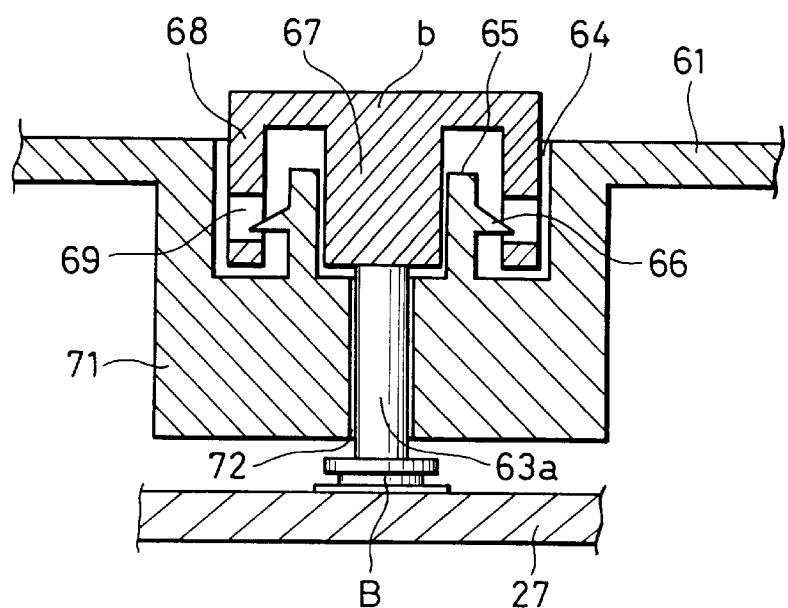
FIG. 6 is a sectional view showing essential components of a signal switch.
Figure 7:
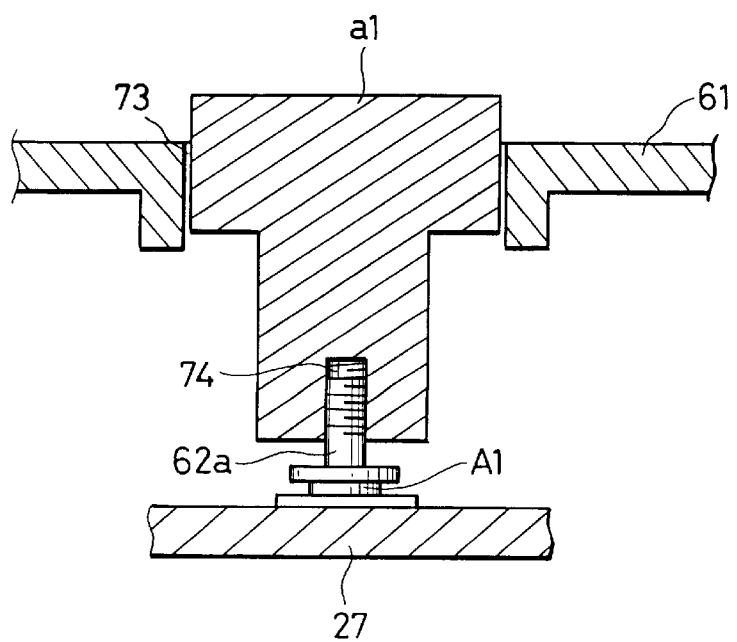
FIG. 7 is a sectional view showing essential components of a discriminating switch.
Figure 11:
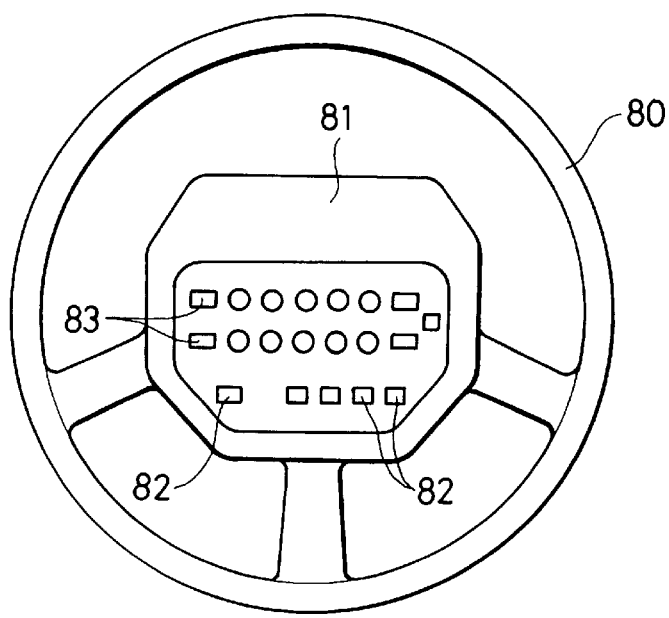
FIG. 11 is a plan view of a conventional switch module.
Figure 12:
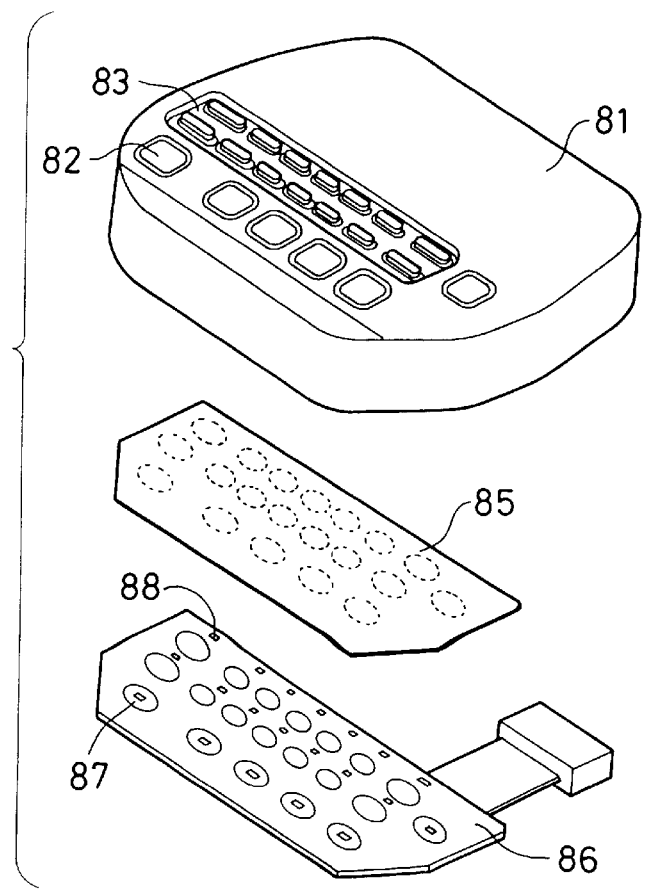
FIG. 12 is an exploded perspective view showing the conventional switch module.

Now, another example of the steering module, which constitutes a second embodiment of the invention, will be described with reference to FIGS. 3 through 10. FIG. 3 is a perspective view showing the steering module of the second embodiment, and its switch module in detail. FIG. 4 is a fragmental perspective view showing essential parts of the PCB. FIG. 5 is a perspective view showing the arrangement of switches. FIGS. 6 and 7 are sectional views showing the structures of the switches. FIGS. 8 through 10 are diagrams for a description of the operation of the embodiment. In those figures, parts corresponding functionally to those already described with reference to the first embodiment are therefore designated by the same reference numerals or characters and their explanations will be omitted.

The second embodiment is different from the above-described first embodiment mainly in the following points: The switch operating sections 16a and 16b are changed in arrangement. Without replacement of the ROM 44, the combination of switch on-off operations achieves mode selections and switch control operations.

As shown in FIG. 3, in the steering module 1 of the second embodiment, the connectors 42a and 42b (cf. FIG. 2) are not provided on both the protrusions 39 of the PCB 27, and instead, as shown in FIG. 4, discriminating switches A1 and A2, and signal switches B, C and D are provided. The rear casing 12 has no replacing window 43 (cf. FIG. 2); that is, it is unnecessary to replace the ROM 44.

The discriminating switches A1 and A2, and the signal switches B, C and D may be tact switches or rubber switches. Those switches provide part of a switch programmable function of the PCB 27.

Now, the driving of the discriminating switches A1 and A2, and the signal switches B, C and D will be described. As shown in FIG. 5, key tops a1, a2, b, c and d are provided on the upper surface of a switch casing 61, and push pins 62a, 62b, and push pins 63a, 63b and 63c are provided. FIG. 5 is an explanatory diagram showing the relationships between the switch casing 61 and the push pins 62a through 63c, and their actual arrangement is as shown in FIGS. 6 and 7. That is, the push pins 62a through 63c are set in the switch casing 61, and the depression of the key tops al through d turns on and off the discriminating switches A1 and A2, and the signal switches B, C and D.

FIG. 6 is a sectional view showing the structure of each of the signal switches B through D. Since the signal switches B through D are equal in structure to one another, the switching structure of the signal switch B only will be described as a typical example of them.

The casing 61 has a recess-like engaging section 64 in which the key top b is fitted. The casing 61 has an inner frame 65 inside. The inner frame 65 has locking pawls 66 on its outer surfaces.

On the other hand, the key top b has a depressing portion 67 at the center, and an outer peripheral portion 68 which is fitted in the engaging section 64. The outer peripheral portion 68 has locking holes 69 with which the aforementioned locking pawls 66 are engaged. That is, by engaging the locking pawls 66 with the locking holes 69, the key top b is prevented from coming off.

The lower portion of the engaging section 64 is a push pin supporting portion 71 which is relatively large in thickness. The push pin supporting portion 71 has a guide hole 72 at the center which is used to guide the push pin 63a vertically. The push pin 63a includes a rod-shaped portion, and a disk-shaped large-diameter portion. The rod-shaped portion is inserted into the guide hole 72. The top end of the rod-shaped portion (the upper end in FIG. 6) is brought into contact with the depression portion 67 of the key top b.

On the other hand, the signal switch B is provided below the push pin 63a. Hence, by depressing the key top b, the signal switch B is turned on and off with the aid of the push pin 63a.

Now, the structure of the discriminating switches A1 and A2 will be described. Since those switches A1 and A2 are equal in structure to each other, the structure of the switch A1 only will be described as a typical example of them. As shown in FIG. 7, the key top a1 of the discriminating switch A1 comprises a large-diameter portion and a small-diameter portion; that is, it is substantially T-shaped in vertical section. The large-diameter portion is engaged with an engaging hole 73 formed in a switch casing 61 in such a manner that it is vertically movable.

On the other hand, the small-diameter portion has a threaded hole 74 in the bottom. The upper end portion of the push pin 62a is threadably engaged with the threaded hole 74. The discriminating switch A1 is provided below the push pin 62a. Hence, by depressing the key top a1, the discriminating switch A1 is turned on and off with the aid of the push pin 62a.

Next, the discriminating switches A1 and A2, and the signal switches B, C an D operate as follows: The discriminating switches A1 and A2 are turned on and off in combination as shown in FIGS. 8 through 10, to select a desired one among various modes such as a radio mode, an air-condition mode, and an auto cruise mode. This will be described in more detail.

It is assumed that, as shown in FIG. 8, the discriminating switch A1 is turned on while the discriminating switch A2 is turned off to select the radio mode. When, under this condition, the signal switch B is operated, "POWER" is selected; when the signal switch C is operated, "AM/FM" is selected; and when the signal switch D is operated, "SEEK" is selected.

Furthermore, it is assumed that, as shown in FIG. 9, the discriminating switch A1 is turned off while the discriminating switch A2 is turned on to select the air condition mode. When, under this condition, the signal switch B is operated, "AUTO" is selected; when the signal switch C is operated, "INSIDE AND OUTSIDE AIR SWITCHING" is selected; and when the signal switch D is operated, "DEF" is selected.

Moreover, it is assumed that, as shown in FIG. 10, both the discriminating switches A1 and A2 are turned off, to select the auto cruise mode. When, under this condition, the signal switch B is operated, "RESUME" is selected; when the signal switch C is operated, "CANCEL" is selected; and when the signal switch D is operated, "SET" is selected.

If summarized, the two discriminating switches A1 and A2, and the three signal switches B, C and D are turned on and off in a variety of combinations, so that a variety of modes and a variety of operations are switched over to one another.

In the switch module 13 (cf. FIG. 1), as shown in FIG. 3, the connecting circuit element 26 is provided similarly as in the above-described case, and the connection to the electronic combination switch 4 and the steering pad 15 is achieved through the connector. Hence, in mounting the steering module 1, similarly as in the case of the first embodiment, the mounting operation and the electrical connection can be achieved at the same time. As was described above, with a small number of switches, a variety of modes and a variety of operations can be switched over to one another. In addition to this effect, the second embodiment has the following effects: the steering module 1 is increased in the number of functions, and is simplified in arrangement.

As was described above, in the steering module of the invention, the switch module coupled to the steering wheel has the switch operating section which may be replaced when necessary. The switch module comprises the PCB having the switch programmable function, the connecting circuit element which electrically connects the PCB to the electronic combination switch, the connector which detachably connects the switch means forming the switch operating section, and the ROM which may be replaced from outside the rear casing, which accommodates the connecting circuit element and the PCB, in response to the replacement of the switch means.

Therefore, the switch operating section can be replaced in response to a given control; that is, without replacement of the whole switch module, a desired control function is obtained. Thus, the steering module having the switch module has a variety of function, and is simplified in structure.

With respect to the switch module in which the switching means are replaceable, the PCB having the switch programmable function has the connecting circuit element which electrically connects the electronic combination switch to the PCB, and the connector which detachably connects the switch means forming the switch operating section, so that the switch means can be replaced, and the ROM can be replaced from outside the rear casing which accommodates the connecting circuit element and the PCB.

Hence, by coupling the switch module to the steering wheel, the electronic combination switch is electrically connected to the switch module. That is, the coupling work and the wiring work are achieved at the same time. Thus, the coupling work is high in efficiency.

Furthermore, the steering pad having the air bag can be coupled through the steering wheel to the switch module. The steering pad has the switch members to drive the tact switches on the PCB.

Hence, the steering module is increased in the number of functions, and is improved in safety.

What is claimed is:

1. A steering module which is coupled through an electronic combination switch to a steering column mounted on a vehicle body, said steering module comprising:

a switch module provided between said electronic combination switch and a steering wheel, said switch module having a switch operating section including a switch connector that removably receives a first switch that is substitutable with a second switch, said first and said second switches adapted to operate in different modes, respectively;

wherein said switch module includes a connector opening through which said switch connector is exposed to allow said switch connector to be accessed when said switch module is mounted to said steering wheel.

2. A steering module as claimed in claim 1, wherein said switch module comprises:

a printed circuit board having a switch programmable function which selects an operating mode in correspondence to traveling control and performs a control operation;

a connecting circuit element which electrically connects said electronic combination switch to said printed circuit board;

said switch connector being mounted on an end portion of said printed circuit board; and a semiconductor read-only memory which is mounted on said printed circuit board and which is accessible through a replacing opening in said switch module when said switch module is mounted to said steering wheel.

3. A steering module as claimed in claim 2, further comprising a steering pad having an air bag and switch operating members adapted to control tact switches on said printed circuit board, said steering pad being mounted on and extending through said steering wheel so that said switch operating members are disposed to control said tact switches.

4. A steering module as claimed in claim 1, wherein said first and said second switches are of different types.

5. A steering module comprising:

a steering wheel; and a switch module provided on a backside of said steering wheel;

wherein said switch module includes a switch operating section having a switch connector that removably receives a first switch that is substitutable with a second switch, said first and said second switches adapted to operate in different modes, respectively, and further wherein said switch module includes a connector opening through which said switch connector is exposed t allow said switch connector to be accessed when said switch module is mounted to said steering wheel.

6. A steering module as claimed in claim 5, wherein said switch module comprises:

a printed circuit board having a switch programmable function which selects an operating mode in correspondence to traveling control and performs a control operation; and a semiconductor read-only memory which is mounted on said printed circuit board and which is accessible through a replacing opening in a rear casing of said switch module when said rear casino is mounted to said steering wheel.

7. A steering module as claimed in claim 6, further comprising a steering pad having an air bag and switch operating members adapted to control tact switches on said printed circuit board, said steering pad being mounted on and extending through said steering wheel so that said switch operating members are disposed to control said tact switches.

8. A steeling module as claimed in claim 5, wherein said first and said second switches are of different types.

* * * * *